No. 706,652. Patented Aug. 12, 1902.
C. D. GRIMES, W. W. SUNDERLAND & B. F. EILERMAN.
COUNTING AND REGISTERING MACHINE.
(Application filed Jan. 29, 1900.)
(No Model.) 5 Sheets—Sheet 1.

Fig. 1.

Witnesses.
Clarence E. Mehlhope
Edward Haat

Inventors
Wilfred W. Sunderland,
Benjamin F. Eilerman,
Charles D. Grimes.
By Arthur Stem, Attorney.

No. 706,652. Patented Aug. 12, 1902.
C. D. GRIMES, W. W. SUNDERLAND & B. F. EILERMAN.
COUNTING AND REGISTERING MACHINE.
(Application filed Jan. 29, 1900.)

(No Model.) 5 Sheets—Sheet 2.

Witnesses.
Clarence E. Mehill Jr.
Edward Haat

Inventors,
Wilfred W. Sunderland,
Benjamin F. Eilerman,
Charles D. Grimes,
By Arthur Stem, Attorney.

No. 706,652. Patented Aug. 12, 1902.
C. D. GRIMES, W. W. SUNDERLAND & B. F. EILERMAN.
COUNTING AND REGISTERING MACHINE.
(Application filed Jan. 29, 1900.)

(No Model.) 5 Sheets—Sheet 5.

Witnesses.
Clarence E. Mehlhop.
Edward Haab.

Inventors
Wilford W. Sunderland,
Benjamin F. Eilerman,
Charles D. Grimes,
By Arthur Elam Attorney.

THE NORRIS PETERS CO., PHOTO-LITHO., WASHINGTON, D. C.

UNITED STATES PATENT OFFICE.

CHARLES D. GRIMES, WILFRED W. SUNDERLAND, AND BENJAMIN F. EILERMAN, OF DAYTON, OHIO.

COUNTING AND REGISTERING MACHINE.

SPECIFICATION forming part of Letters Patent No. 706,652, dated August 12, 1902.

Application filed January 29, 1900. Serial No. 3,166. (No model.)

*To all whom it may concern:*

Be it known that we, CHARLES D. GRIMES, WILFRED W. SUNDERLAND, and BENJAMIN F. EILERMAN, citizens of the United States, and residents of Dayton, in the county of Montgomery and State of Ohio, have invented a new and useful Improvement in Automatic Counting and Registering Machines, of which the following is a full, clear, and exact description, reference being had to the accompanying drawings, which form part of this specification.

Our invention relates to an improved automatic counting and registering machine, more especially adapted for use in putting up paper into packages for shipment, and is intended to accomplish four things: first, to count the number of sheets to each package; second, to trip off the package when it has received the requisite number of sheets and make way for another; third, while each package is being counted to register a certain number, whose proportion to the number of sheets in the package may be varied at will, and, fourth, to indicate the sum total of the aforementioned certain numbers registered for any number of packages.

Hitherto it has been customary in preparing paper for shipment to have it counted and put up into packages by hand. This has been found to be an expensive and inaccurate method, the packages seldom containing the requisite number of sheets. By the use of our machine packages are prepared containing the exact number of sheets required.

Paper is ordered from the factory according to two systems of measurement by what is called "ream-measure" and by "board-measure." In ream-measure there are always five hundred sheets to the bundle, the weight of the bundle varying according to the size and thickness of the sheet. In board-measure each bundle should weigh fifty pounds, and the number of sheets varies. In ream-measure, as stated above, the weight of the bundle varies, and when very heavy paper is ordered five hundred sheets would make too large a package. In this case the paper is put up in half-reams or quarter-reams. Again, the paper may be so light that it may be put up in packages containing one and a quarter, one and a half, or two reams without making too large a package.

Our machine is designed to count the desired number of sheets to a bundle and to automatically trip off the package and begin counting anew when a bundle containing the requisite number of sheets has been counted out, as will appear more fully later; but our machine is designed to do something more than count out the number of sheets to a package. As stated above, paper is ordered by weight as well as by number, and in an order for paper the weight per package is always specified or implied. Now it is frequently necessary while filling an order for paper to weigh the packages in order to see if they weigh together as much as they should weigh according to specification. It would seem to be a small matter to multiply the specified weight by the number of packages on the scale and then compare this calculated total weight according to specification with the actual weight according to scale; but as man is always likely to err, and especially a workman, it is found to be an advantage to add the specified weights automatically, and herein lies the purpose of the recording of the certain number referred to above. During the counting of the package for each sheet counted a set of counters registers one until a certain number, which represents the specified weight, has been counted. This set of counters is then thrown out and does not count again until a new package is started, whereupon it begins counting again from where it left off, and so on, until all the packages are made up. It will be readily seen of what advantage is this second system of counters. As the packages are made up they may be piled upon a scale-platform, and a glance at the scale and at our improved machine will show the difference between the specified weight and the actual weight.

It is intended that our machine shall be provided with a suitable case having openings, as described later; but said case has been left out in the drawings.

The uprights A A A A, suitably connected and braced by cross-pieces, form the main outlines of the case which is to contain the machinery of our improved automatic counting and registering machine, the front and ends of the case being left out of the drawings for the sake of clearness.

Figure 3:
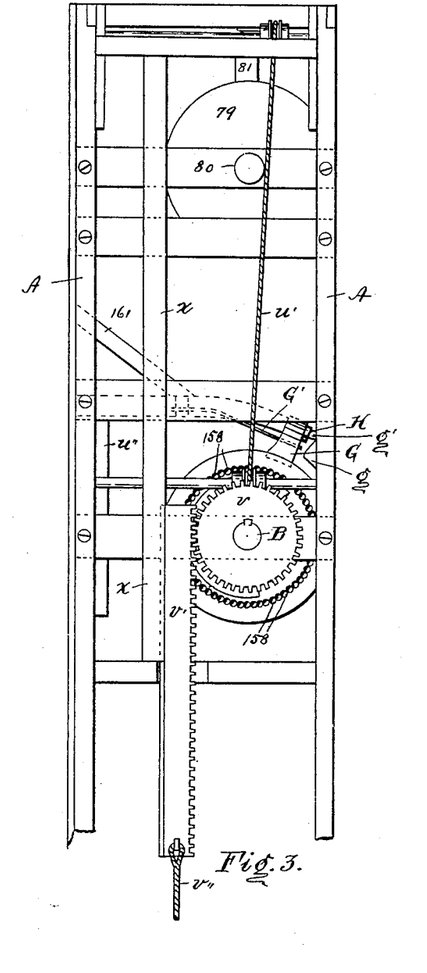
Fig. 3 shows an end elevation of Fig. 1 looked at from the left.
Figure 12:
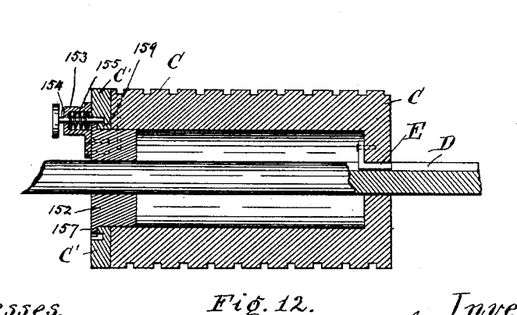
Fig. 12 shows a section of the cylinder C and the manner of attaching the ring C'.

Mounted on the shaft B, which is hung on the cross-pieces B' B'', is a cylinder C, provided with a thread on its outside surface. The shaft B is provided with a long slot D, (see Fig. 12,) and by means of this slot and the key E the cylinder C is attached to the shaft B in such a manner that it may slide lengthwise along the shaft, but cannot turn without turning the shaft. The dog G, pivoted at H, is adapted to engage with the thread on the cylinder C, and when thus engaged the cylinder C, if rotated, will travel along the shaft B. This dog G is pivoted to a framework 161, which is attached to the rear plate of the machine, as seen in Fig. 3.

Keyed to the shaft B is the beveled gear-wheel I, (see Fig. 2,) which engages with another bevel gear-wheel I', keyed to shaft J, which runs at right angles to the shaft B and is journaled in a support J' and a sleeve J''.

K and K' are two ratchet-wheels having the same number of teeth, K being keyed to the shaft J and K' being loosely mounted on the shaft J. Thus it will be seen that any rotation of the ratchet-wheel K is communicated through the shaft J and the beveled gear I' I to the shaft B and the cylinder C.

Figure 6:
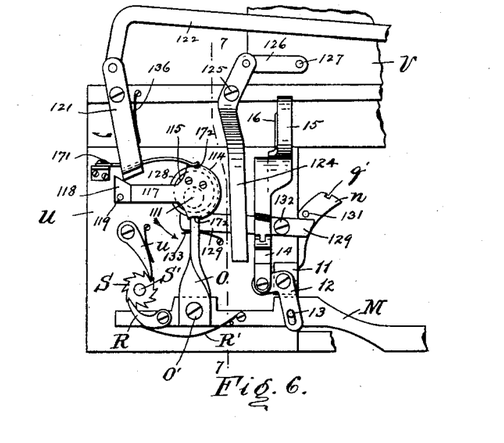
Fig. 6 shows a rear elevation of the plate U.

The oscillating lever L is loosely hung on the shaft J. Pivotally attached to the lever L at M' is the arm M, which is pivotally attached near its other end, Fig. 6, at O' to the swinging arm O. The pawl N is pivotally attached to the arm M and is adapted to engage the teeth of both ratchet-wheels K and K'. It is held in engagement with said wheels by the spring P, which is mounted on a downward-extending lug Q on the arm M. At the other end of the arm M, Fig. 6, is pivotally attached the pawl R, held in engagement with the ratchet-wheel S by the spring R'. The ratchet-wheel S is keyed to the shaft S', which has keyed to its front end the counting-wheel S''. The ratchet-wheel S is prevented from counter rotation by the dog u. As the lever L is oscillated it is readily seen that the ratchet-wheels K, K', and S will be rotated, respectively, by the pawls N and R.

S'', T, and T' are three ordinary decimal-counting wheels, each having ten teeth. S'' has a tooth s, adapted to engage the wheel T, and a tooth t, adapted to engage the wheel T', so that a complete revolution of S'' turns T one division and ten revolutions of S'' revolves T once, which in turn for each revolution turns T' one division and for ten revolutions revolves T' completely. Thus S'', having ten teeth, when T' has made one complete revolution it will have counted one thousand. These counting-wheels are pivoted on the plate U, which is fastened to the main framework of the machine. The wheels T', T, and S'' are prevented from counter rotation in any convenient manner, in the present case having concave teeth bearing against a circular disk. This arrangement may be replaced by a retaining-pawl. This system of counters is for counting the number of sheets. Pivoted on the plate V is another set of counters to count pounds. W has ten teeth, W' ten teeth, and W'' twenty teeth, so that when W'' has made a complete revolution two thousand pounds or one ton has been counted. W'' has a tooth w'', adapted to engage the teeth in the cog-wheel X, also pinioned to the plate V and designed to register tons. The system of counters X, W'', W', and W is operated by the pawl a, adapted to engage with the ratchet-wheel Y, which is secured to the counting-wheel W. This pawl a is pivotally attached to the lever b. The lever b is pivotally attached to the plate V at b''. The dog d, having a lug e''' on its rear face to engage the teeth of the ratchet-wheel K', is pivoted to the plate U at d' and is held down, so as bear against the teeth of the ratchet-wheel K' by the spring d''. The link c is pivotally attached at one end to the lever b at c' and at the other end to the dog d at c'', so that as the ratchet-wheel K' is rotated to the left, Fig. 1, the dog d is given an oscillating up-and-down motion, which is communicated through the link c and the lever b to the pawl a, which in turn rotates the units counter-wheel W.

Figures 5, 8, 15, 16, 17:
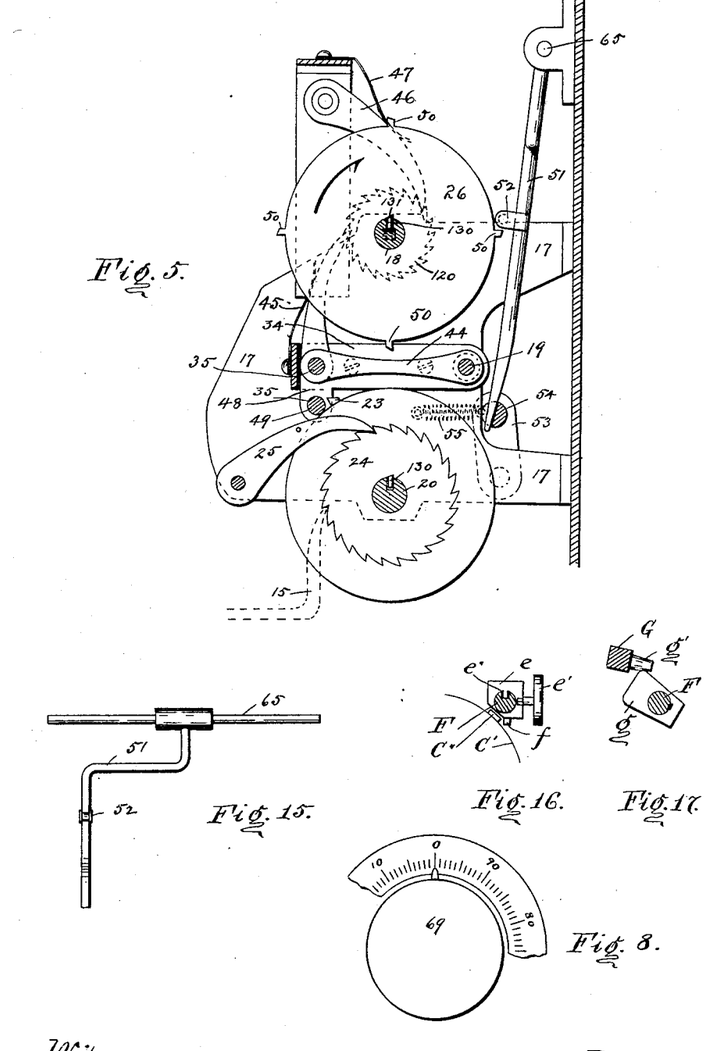
Fig. 5 shows a section of the above on the line 5 5.
Fig. 8 shows a detail view of the mill-head 69 shown in Fig. 1.
Fig. 15 shows a detail of the arm 51.
Figs. 16, 17, and 18 are detail views of the rod F.

F is a slotted graduated rod journaled in the cross-pieces F' and F'', which are secured to the frame of the machine. Each division is equal to the distance that the cylinder C will travel along the shaft B in making one complete revolution.

e is a gage having a tongue which fits loosely in the slot e'', Fig. 16, and allows the gage to slide freely along the rod F, but prevents it from turning on said rod F. The gage e may be fixed in any position on the rod F by means of the set-screw $e'$. The gage $e$ has a projecting arm $f$, which just clears the surface of the cylinder C as it revolves under it.

The cylinder C has at one end a loosely-attached graduated ring $C'$ of the same diameter as the cylinder and bearing a radially-projecting lug $C''$, which when the cylinder C has moved far enough forward to bring the ring $C'$ under the arm $f$ of the gage $e$ will finally in its rotation strike the arm $f$, and thus cause the rod F to rock on its axis. The ring $C'$ is graduated and has the same number of divisions as there are teeth in the ratchet-wheel K, in this case fifty, each division being equal to the distance which the cylinder C will rotate for one oscillation of the lever L. The ring $C'$ is attached to the end of the cylinder C in such a manner that the angular position of its zero-point with reference to the arrow 151 may be varied so as to permit any of the graduations to be brought opposite the arrow 151. This arrangement is for adjusting the cylinder so that it may rotate any part of a revolution before the lug $C''$ shall strike the arm $f$. We do not limit ourselves to any particular manner of attaching this ring, but the manner shown is preferred, Figs. 3 and 12. The core 152 is bolted or otherwise fastened to the cylinder C, which is hollowed out and is provided with a flange 157. The ring $C'$ has a flange 159, which fits behind the flange 157 on the core 152. A series of holes 158 equal to the number of graduations on the ring $C'$ are bored half through the flange 157 and the other half through the ring $C'$. A pin 154 is mounted in the collar 153 and is adapted to fit within these holes. It is held in engagement with these holes by the spring 155. It is readily seen that by withdrawing this pin 154 the ring $C'$ may be loosely turned on the core 152, and releasing this pin allows the spring 155 to force it into the holes 158, which fixes the ring $C'$ in its angular position with reference to the cylinder C. The dog G is provided with a spring $G'$, which tends to hold it out of the thread of the cylinder C. When the cylinder C is counting, however, the dog G is held in the thread of the cylinder C by the cam $g$, which is keyed to the rod F and normally bears against the lug $g'$ at the end of the dog G. The rocking of the rod F causes the cam $g$ to remove its support from the lug $g'$, and the elasticity of the spring $G'$ comes into play and raises the dog G out of the thread of the cylinder C.

$h$ is a dog which is keyed to the shaft $h''$, which shaft is journaled in the sleeve $h'''$, Fig. 2, and has keyed to its other end the arm $i$, which will be referred to later. This sleeve $h'''$ is secured to the cross-piece $F'''$. The spring $h''''$, Fig. 1, tends to hold the dog $h$ down against the lug $h'$ upon the rod F, so that when the rod F is rocked backward the dog $h$ is forced down in front of the lug $h'$, and thus prevents the rod F from rotating forward again until the dog $h$ is raised.

Figure 2:
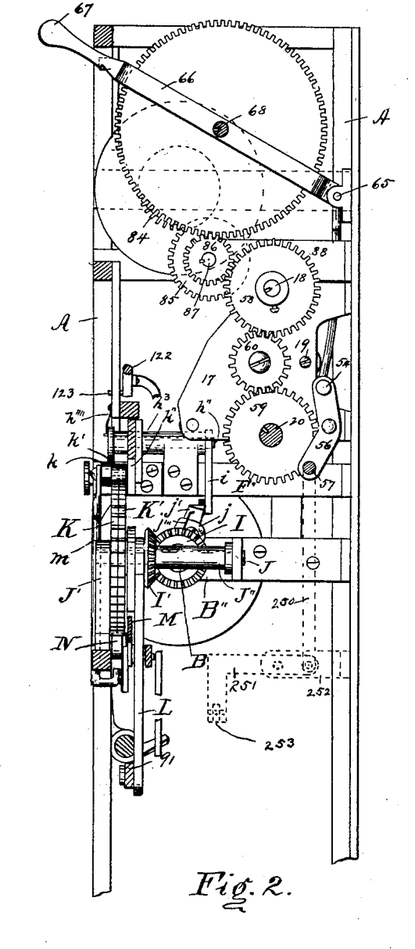
Fig. 2 shows a section on the line 2 2 of Fig. 1 looked at from the right.

Keyed to the shaft B is the cam $j$, Fig. 2, having pivoted to it the arm $j'$ in such a way that when the shaft B is rotating forward the arm $j'$ will strike the arm $i$, but by means of a pivotal connection with the cam $j$ it will rotate out of the way, so as to pass the arm $i$, the spring $j'''$ returning it to its normal position; but when the shaft B rotates backward and the arm $j'$ strikes the arm $i$ the arm $j'$ is held in position by a pin, against which it is held by the spring $j'''$, and is thus prevented from passing the arm $i$. The arms $i$ and $j'$ have their ends beveled, so that when they strike together the arm $i$ is rotated toward the cylinder C, thus rotating the shaft $h''$ and raising the dog $h$.

Figures 13, 14:
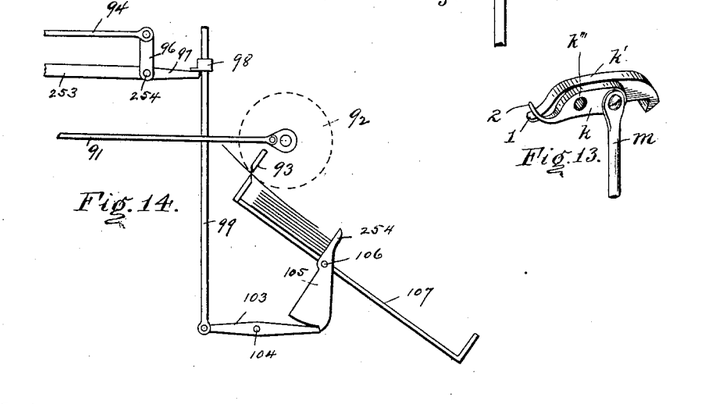
Fig. 13 shows a detail view of the lever k''' and dog k'.
Fig. 14 shows a manner of tripping off the bundles.
Figure 18:
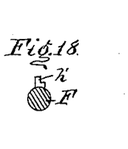

Pivoted upon the angle-bar $k''$, which is bolted to the cross-piece $F''$, Fig. 2, are the dog $k'$ and the lever $k$, having tailpieces, respectively, 1 and 2, the tailpiece 2 of $k$ bearing upon the tailpiece 1 of $k'$, Fig. 13. Tailpiece 2 is adapted to engage with a pin 3 in the end and back of the center of the rod F, so that when the rod F rocks backward the pin 3 bears on the tailpiece 2, which in turn bears on the tailpiece 1, thus raising the dog $k'$ out of engagement with the ratchet-wheels K K' and also raising the lever $k$, to which is attached the link $m$. The link $m$ is hooked at its lower end, so as to pass behind the framework of the machine, Fig. 2. As it is raised it abuts against the end $N''$ of the dog N and raises it, thus lowering the other end and taking it out of engagement with the ratchet-wheels K' K.

$n$ is a dog pivotally attached to the plate U, so as to engage the ratchet-wheel K and prevent its counter rotation. It has a downwardly-extending leg $n'$, which bears against a disk on the counter-wheel $T'$. This disk has two lugs $o''$ at points diametrically opposite, so that each time the machine counts five hundred sheets the lug $o''$ strikes the leg $n'$, causing the dog $n$ to rotate and lose its engagement with the ratchet-wheel K. A catch $p$, pivotally attached to the plate U at $p'$, has a tooth $q$, adapted to fit within the notch $q'$ in the head of the dog $n$, which tooth $q$ as the dog $n$ rises out of engagement with the ratchet-wheel K drops into the notch $q'$ and holds the dog $n$ out of engagement. The catch $p$ has a downward-extending part $p''$, which is so shaped as to be struck by a lug $p'''$ on the rear face of the counting-wheel $S''$, and the said lug $p'''$ is in such a position relative to the tooth $s$ that it will strike the part $p''$ of the catch $p$ the next part turn after the turn when the tooth $s$ engages the wheel T. This causes the catch $p$ to rise and withdraw the tooth $q$ out of the notch $q'$, thus allowing the dog $n$ to drop back into engagement with the ratchet-wheel K. This upward movement of the catch $p$ occurs at every rotation of the wheel $S''$; but of course it is only during the revolution that counts five hundred that it is operative for the purpose for which it is designed—namely, to release the dog $n$.

Loosely mounted on the shaft B is a collar $r$, having a slot $r'$ in its surface and prevented from rotating by the arm $r''$, the end of which travels in the slot $r'''$. The collar $r$ has a lug $r^4$, to which is attached one end of the cord $u'$, the other end of which is attached to the weight $u''$. Rigidly attached to the cylinder C is the sleeve $t$, having a flange $t'$, by which it is secured to the cylinder, and a tongue $t''$, which slides in the groove $r'$ of the collar $r$. The spur-wheel $v$, Fig. 3, is keyed to the end of the shaft B and is meshed with the rack $v'$, to which is attached by the cord $v''$ a weight. (Not shown in the drawings.) This rack $v'$ travels in the guide-rod $x$ and as the shaft B revolves forward rises its full length, and then when the shaft B is free to revolve backward is pulled down by said weight, thus revolving the shaft B backward until the arm $j'$ at the other end of the shaft B strikes the arm $i$, and thus arrests the backward motion of said shaft B.

Figure 1:
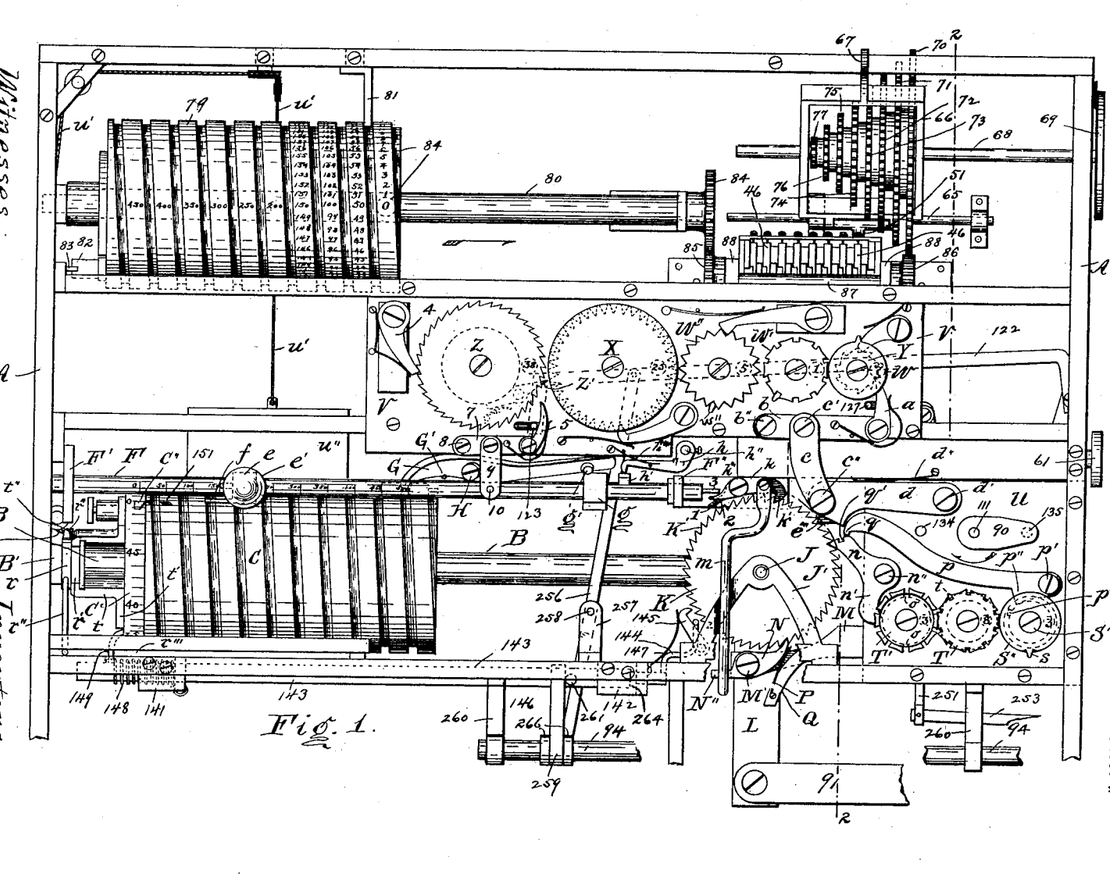
Figure 1 shows a front elevation of our automatic counting and registering machine with the front plate left out and the base of the machine cut away.

Pinioned to the plate V, Fig. 1, is a counter-wheel Z to indicate bundles. This wheel, as will be shown later, is only in use when the machine is counting according to board-measure. In board-measure each bundle weighs fifty pounds, and forty bundles of course should make a ton. The wheel Z has forty teeth and a dog Z', so that when it has made a complete revolution the dog Z' comes into engagement with the ton-indicating wheel X and turns it one division. This wheel Z is prevented from counter rotation by the dog 4 and is operated by the pawl 5, as shown in Fig. 1, held out of engagement by the lug 123, which is carried at one end of the lever 7, pivoted at 8, the center of which lever is connected by the link 9 to the lug 10 on the rod F. Thus it will be seen that the rocking backward of the rod F will cause the pawl 5 to rotate the wheel Z one division.

Figure 4:
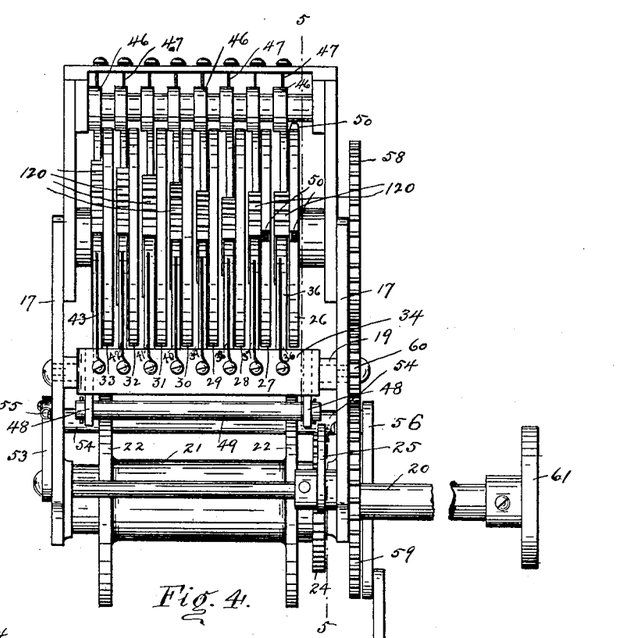
Fig. 4 shows a front elevation of the tripping mechanism used in ream-measure.
Figure 7:
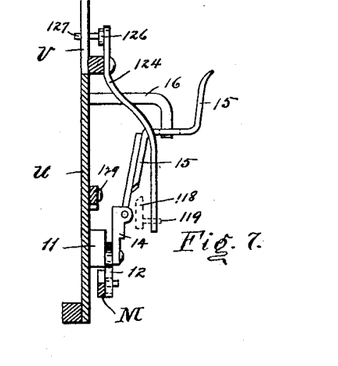
Fig. 7 shows a section through this plate on the lines 7 7.

Pivoted to the block 11, (see Figs. 6 and 7,) which is mounted on the rear of the plate U, is an L-shaped lever 12, one end of which is connected by a pin and slot 13 to the arm M and the other end pivoted to the block 14. The dog 15 is pivoted to the block 14 at its upper end and is prevented from any side motion by the dependent arm 16, rigidly attached to the frame at one end and having the other end depending through a slot in the dog 15. It will be readily seen that any motion of the arm M to left or right will alternately raise and lower the dog 15. This dog 15 is intended to operate a system of counters. (Shown in Figs. 2, 4, and 5 and now to be described.) The pawl 15 operates the device for regulating the trip-off of the packages in ream-measure, which device determines the size of the packages.

Rigidly secured to the rear framework of the machine are the two parallel plates 17, carrying the shafts 18, 19, and 20. Loosely mounted on the shaft 20, in a way to be described later, is the spool 21, having flanges 22, which bear lugs 23 on their outer periphery. Rigidly attached to the spool 21 is the ratchet-wheel 24, which is operated by the pawl 15. This ratchet-wheel has twenty-five teeth and is prevented from counter rotation by the dog 25. Loosely mounted on the shaft 18 are a series of disks—in this case eight in number—26, 27, 28, 29, 30, 31, 32, and 33, all of the same diameter, but having ratchet-wheels rigidly attached to them, each with a different number of teeth. A frame 34 is pivoted at one side on the shaft 19 and carries at its other side the rod 35, upon which are mounted the dogs 36 to 43 for operating the ratchet on the disks 26 to 33. These dogs are held apart by spacers 44 and are held in engagement with the ratchet-wheels by springs 45. The disks 26 to 33 are prevented from rotation in the opposite direction by dogs 46, held in place by the springs 47. The frame 34 has two downward-extending flanges 48, carrying the rod 49, which rests upon the flanges 22 of the spool 21. As the pawl 15 operates, the ratchet-wheel 24 each time the spool 21 makes a complete revolution, the lugs 23 on the outer periphery of its flanges strike the rod 49 and raise it, thus causing the entire frame 34 to revolve upward about the shaft 19. This raises the pawls 36 to 43 and causes them to turn the disks 26 to 33 each one division. The disks 26 to 33 have beveled lugs 50 on their outer periphery, which are designed to operate a tripping mechanism. The depending arm 51, bearing the lug 52, is adjustably hinged to the rear framework of the machine in such a way that it may be moved in the direction of the length of the shaft 18, so that the lug 52 may be brought opposite any one of the disks 26 to 33.

Pivoted to the plate 17 are the arms 53 and 56, bearing at their upper ends the rod 54. This rod is kept in position against the edges of the plates 17 by a spring 55, attached to the arm 53. The end of the depending arm 51 extends down and bears against the rod 54. When one of the lugs 50 strikes the lug 52, the arm 51 is forced back and in turn forces back the rod 54. This rocks the arm 56, which is connected with a tripping mechanism for tripping off the packages. As a ream contains five hundred sheets, one-quarter of a ream contains one hundred and twenty-five sheets. The ratchet-wheel on the disk 26 has twenty teeth and four lugs 50, making five teeth for each lug. The ratchet-wheel 24 has twenty-five teeth. Every time the ratchet-wheel 24 makes a complete revolution the beveled lug 23 strikes the rod 49, which causes the disk 26 to rotate one division. When the ratchet 24 makes its fifth revolution, the disk 26 moves the fifth division and causes one of the lugs 50 to strike the lug 52, and thus cause the arm 51 to operate the tripping device. As is readily seen, the package thus tripped off will contain one hundred and twenty-five sheets, or a quarter of a ream. The ratchet-wheel on the disk 27 has twenty teeth also, but only two lugs, so that it takes ten revolutions of the ratchet-wheel 24, or two hundred and fifty sheets, for one of the lugs to strike and put in motion the tripping mechanism. Of course each time the lug 23 strikes the rod 49 all the disks 26 to 33 are revolved one division; but the arm 51 is adjustable, so that the lug 52 may be placed in front of that wheel which is intended to do the tripping, and it is this wheel only which is operative. By varying the number of teeth in their respective ratchet-wheels the rest of the disks 26 to 33 are made to trip off packages containing, respectively, three-quarters, one, one and a quarter, one and a half, one and three-quarters, two reams, or any multiple of a ream when in use.

As we said before, the disks 26 to 33 are loosely mounted on the shaft 18. The shaft 18 is slotted, and under each wheel is a small hole containing a coiled spring bearing against a short spline 130 of the length of the thickness of the disk, having its outer edge beveled and adapted to fit within an angular notch 131 in the hub of the disk. If the shaft be rotated in the direction of the arrow, Fig. 5, the pressure of the spring forces the spline into the notch 131 and the disk is rotated with the shaft. If, however, the shaft be rotated in the opposite direction, the spline, by reason of its beveled outer edge, slips out of the slot 131, thus compressing the spring, and slides along the inner side of the hub of the disk without rotating it. Thus the disks 26 to 33 are free to rotate in the direction of the arrow without rotating the shaft. The lugs 50 in each of the disks 26 to 33 all have the same angular position relative to the notch 131, so that no matter what angular position the spline 130 is in with reference to the notch 131 one revolution of the shaft in the direction of the arrow will bring each spline into engagement with the corresponding notch in the disks, and thus assemble the lugs 50 in a line. The zero position of each, of course, is just below the lug 52, the position it would occupy after tripping a package. The spool 21 is mounted on the shaft 20 in a manner similar to that in which the disks 26 to 33 are mounted on the shaft 18.

Keyed to the shafts 18 and 20, respectively, are the spur-wheels 58 and 59, which are connected by the spur-wheel 60, pinioned to the frame 17. A mill-head 61 is attached to the shaft 20 by set-screw or in any other convenient manner. The spur-gear 58 60 59 is so arranged that when the lugs 50 have all reached the position shown in Fig. 5, just having struck the lug 52, the lug 23 will have reached a position just beyond the rod 23, just having raised this rod. This is called the "zero" position, and the lugs are brought to this position by turning the head 61.

The frame 66 (see Figs. 1, 2, and 15) is hinged to the rods 65 in such a way that it may be moved in the direction of the rod 65 as the depending arm 51 moves in the same direction. Moving the frame moves the arm 51 at the same time. The frame 66 has a handle 67 for adjusting it and carries a shaft 68, which is turned by a mill-head 69. A number of cog-wheels (corresponding to the number of disks 26 to 33) 70 to 77 are keyed to this shaft and are spaced so that the distances between their centers are equal to the distances between the centers of the disks 26 to 33. A threaded graduated cylinder 79 is loosely mounted on the shaft 80 in the same way as the cylinder C is mounted on the shaft B. A tongue 81, fixed to the top of the frame of the machine, projects down into the thread of the cylinder 79. As the cylinder is rotated this tongue thus working in the thread compels the cylinder to travel along the shaft 80 in the direction of the arrow. One turn of the cylinder is divided into fifty divisions, and each of these divisions represents one pound. A stop 82, striking against the pin 83, stops the cylinder as it is rotated backward, and the zero-mark comes under an opening 84 (shown in dotted lines) in the face-plate of the machine. This plate, as before stated, has been left out of the drawings for the sake of appearance.

Figure 19:
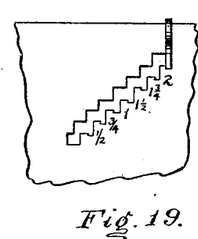
Fig. 19 is a detail view of a part of the case.

A shaft 87 is journaled in the two angle-plates 88, Figs. 1 and 2, which are bolted to the rear frame of the machine immediately above the plate 17. The unequal-sized cog-wheels 85 and 86 are keyed to the ends of this shaft 87, the one, 85, being meshed with a cog-wheel 84, which is keyed to the end of the shaft 80, and the other, 86, being designed to mesh with either of the cog-wheels 70 to 77. A mill-head 69 is keyed to the shaft 68 and carries a pointer, which travels over a circular card divided into a hundred divisions, Fig. 8. The cog-wheels 70 to 77 correspond to the various parts of a ream of which a package is made—e. g., one-quarter, one-half, three-quarters, &c.—and have such a number of teeth that when the smallest cogs 77, corresponding to a quarter of a ream, are meshed with the wheel 86 if the head 69 is turned until the needle comes opposite a given number of pounds—e. g., "80"—the cylinder 79 will show one-fourth of that, or twenty, under the opening 84. In other words, the purpose of the system of cogs 70 to 77, in conjunction with the graduated cylinder 79, is to show on the cylinder 79 the number of pounds that each package must contain by simply turning the needle on the mill-head 69 to indicate the number of pounds that the ream is to contain. This avoids calculation, and a simple glance at our register shows not only what weight of ream is being packed, but also the weight of each package. The above-described attachment of the frame 66 to the depending arm 51 makes it possible by simply bringing a cog that is to indicate the weight of any part of a ream—one-half, say—to mesh with the cog 86 the lug 52 will be brought opposite the corresponding disk for tripping off one-half-ream packages. This is regulated very easily by a stepped slot in the case inclosing the machine, in which travels the handle 67 of the frame 66, Fig. 19.

The lever L has attached to it a pitman-rod 91, which is connected with a crank upon the shaft bearing the knife 93, Fig. 14, which cuts off the sheets of paper as they come out of the paper-machine. The rotation of this shaft gives the arm 91 an oscillating motion, which is imparted to the lever L, and it is this oscillating motion which operates the counting-machine. Every time the knife 93 cuts off a sheet the lever L oscillates once and counts one sheet.

Any convenient manner of throwing a package after it has received its full number of sheets may be adopted; but the one now described is preferred. (See Figs. 2 and 14.)

Pivotally attached to the arm 56 by the pin 57 is a link 250, which has pivotally attached to its lower end the angular lever 251, said lever 251 being pivoted to an angle-bar 252, secured to the rear plate of the machine. The angular lever 251 has pivotally attached to it at its lower end the link 253. Said link 253 is rigidly attached at its other end to a rock-shaft 254, carrying an arm 97, which is adapted to operate or butt against, as it is raised, a lug 98 on a rod 99. Said rod 99 has its lower end pivotally attached to a lever 103, pinioned at 104. Said lever 103 is held in engagement by gravity with a projection on swinging arm 105, pivoted at 106. Said arm 105 has an upward projection 254, which is adapted to hold the paper as it comes onto the slide 107. As the arm 56 is rotated upward it raises the link 250, which in turn causes to rotate the angular lever 251, thus depressing one end of the lever 253 and causing the rock-shaft 254 to rotate and raise the arm 97, which in turn through the lug 98 raises the rod 99 and causes the lever 103 to rotate about the point 104, thus releasing the swinging arm 105. The weight of the paper bearing against the upward-extending part 254 of the arm 105 causes this arm to rotate about the point 106, thus permitting the package of paper to slide down on the inclined surface 107. When relieved of the pressure of the package, the peculiar shape of the swinging arm 105 causes it to rotate back to its original position. Gravity then causes the other parts to return to their original position, as shown in Fig. 14, with the end of the lever 103 supporting the arm 105 in the position shown. This method of tripping off a package is very simple and is readily understood from a glance at the drawings. Therefore any lengthy description is unnecessary.

Figure 20:
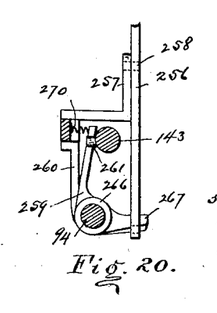
Fig. 20 is a detail view of the angular lever 259.

In board-measure the packages are caused to be tripped in the following manner: Loosely hung in the collars 141 and 142 (see Fig. 1) is a rod 143, carrying at its right-hand end an arm 144 and at its left-hand end an arm 149, said arm 149 being adapted to be struck by the cylinder C as it slides back along the shaft B to its original position. Said rod is also provided at its left-hand end with a coiled spring, which is attached at one end to the collar 141 and at the other end to the arm 149 and tends to hold the rod in such a position that shoulder 264 butts against the collar 142. A dog 145 is pivoted to the support J' and is adapted to engage with the cog-wheel K, and in the position of the cylinder C shown in Fig. 1 is prevented from so doing by the arm 144. The spring 147 tends to hold said dog 105 in engagement with the wheel K. Loosely supported by the brackets 260 is a rod 94. Mounted on this rod 94 is an angular lever 259, held in position by the two collars 266. The upper end of said lever 259 in board-measure is intended to be engaged by a lug 261 on the rod 143, so that when the cylinder C strikes the arm 149 and moves it to the left the rod 143 will cause the rod 94 to move in the same direction. (See Fig. 20.) In ream-measure, however, a lever 256, pivoted to the bracket 257 at 258, is caused to strike against the end 267 of the lever 259 and forces it out of engagement with a lug 261. This lever 256 is attached at its upper end to the arm 122 and is operated by the switching device to be described later. Each time the cylinder C in board-measure returns to its initial position and strikes the arm 149 the rod 94 is pulled to the left. This rod 94 has its other end pivotally attached to the arm 96, which is rigidly attached to the rock-shaft 254, so that as this rod 94 (see Fig. 14) is pulled to the left it causes the arm 97 to strike against the lug 98 on the rod 99 and trip off a package, as described in the case of ream-measure.

The machine as shown is ready for counting by ream-measure. It is changed to count board-measure by turning the arm 90, Fig. 1, which operates a switching device. Said device will be more conveniently described later.

To show the operation of our machine, I will take two cases, one in ream-measure and one in board-measure.

Suppose that an order is received for fifty reams of paper of one hundred and sixty pounds to the ream to be shipped in packages each of which contains a quarter of a ream, the total order being for eight thousand pounds of paper. The handle 67 is first fixed on the step opposite "One-quarter," Fig. 19. The head 69 is turned once around the dial and then partly around again until opposite the number "60." The number "40" then, as representing the weight of each package, will appear at the opening 84 on the cylinder 79. The disk 61 is now turned until the tripping mechanism is in its zero position, as described above. Next the ring C' is adjusted to read "10" and the gage e slipped along the rod F until it comes to the division "150." Then the paper-machine is started. Every time a sheet is cut the lever L is oscillated, thus causing the pawl N to turn the ratchet-wheels K K' and the arm M through the pawl S to turn the sheet-counting wheel S" and by the lever 12 and pawl 15 to operate the ratchet 24. Of course everything moves one division for each oscillation of the lever L. The rotation of the wheel K' through the arm $d$, the link $c$, lever $b$, and pawl $a$ causes the wheel W to register a pound every time a sheet is cut off. This goes on until the ratchet-wheel 24 has been caused to revolve five times, when as its fifth revolution is completed the lug 50 is brought into contact with the lug 52 and a package containing one-quarter of a ream is tripped off and another is begun. As the one hundred and sixtieth sheet is counted the lug C" strikes the projecting arm $f$ of the gage $e$, thus rocking the rod F backward. This causes the cam $g$ to remove from its contact with the lug $g'$ on the dog G, and the upward pressure of the spring G' forces the dog G out of mesh with the thread of the cylinder C. Instantly the weight $u''$ by its pull on the cord $u'$ pulls the cylinder back along the shaft B into its initial longitudinal position. At the same time the rocking of the rod F has caused the lug $h'$ to move out of the way of the dog $h$, thus allowing the dog $h$ to descend in front of the lug $h'$ and lock the rod F in this position. The rocking of the rod F has also caused the pin 3 on the end of the rod F to bear down on the tailpiece 2 of the lever $k$, which in turn presses down the tailpiece 3 of the dog $k'$, thus causing the dog $k'$ to release its hold of the ratchet-wheels K K' and the other end of the lever $k$ to rise. In rising the lever $k$ lifts the arm $m$, thus causing it to pull up on the end N" of the pawl N, which movement takes the said pawl N out of mesh with the two ratchet-wheels K K'. The rocking of the rod F also causes the link 9 to push up the lever 7; but as the pawl 5 is not in mesh with the ratchet-wheel Z this wheel does not turn. The pawls R and 15 are still in mesh with their respective ratchet-wheels S and 24, and these continue to register; but the oscillation of the lever M has no effect upon the ratchet-wheels K and K'. The pound-registering mechanism is therefore at rest, reading "one hundred and sixty pounds." As the two hundred and fiftieth sheet is counted another lug 50 upon the disk 26 strikes the lug 52, causing a package to be tripped off; so, also, when the three hundred and seventy-fifth sheet is counted. As the five hundredth sheet is counted the fourth lug on the disk 26 strikes the lug 52 and causes a package to be tripped. At the same time as this five hundredth sheet is counted one of the lugs $o'$ on the sheet-counting wheel T' strikes the arm $n'$ of the dog $n$, thus causing the dog $n$ to rise out of mesh with the ratchet-wheel K. As it rises the tooth $q$ of the catch $p$ drops into the notch $q'$ and holds the dog $n$ from meshing with the ratchet-wheel K. Instantly that the ratchet-wheel K is released the weight on the cord $v''$ exerts a pull on the ratchet $v'$, drawing it down and causing it to revolve backward the cylinder C to its initial angular position. Just as it reaches its initial position the arm $j'$ on the cam $j$ strikes the arm $i$ and revolves the arm $i$ toward the cylinder C, thus raising the dog $h$ from its position in front of the lug $h'$ on the rod F. This releases the rod F and makes it free to rock forward into its former position, and this it is compelled to do by the pressure of the spring P against the dog N, which presses it upward, thus pushing down its tailpiece N", which in turn pulls down the link $m$. This downward pull of the link $m$ through the lever $k$ and its tailpiece 2 and projecting lug 3 on the rod F causes the rod F to rock back into its first position. This causes the cam $g$ to raise the lug $g'$ on the end of the dog G, thus putting the dog G in mesh with the thread on the cylinder C. Of course this is all done instantly while the lever L is oscillating backward, and when it starts forward again everything is in its first position, and the machine starts to counting and recording pounds and sheets, as at first. The first part turn that the wheel S" makes—in other words, as the five hundred and first sheet is counted—the lug $p'''$ on the wheel S" strikes the part $p''$ of the catch $p$, raising it and releasing the tooth $q$ from the notch $q'$ of the dog $n$, which permits the dog $n$ to fall back into mesh with the ratchet-wheel K. Everything then goes on as before until the system of counters W W' W" X show the requisite tonnage—in this case eight thousand pounds. Then when the last package for this tonnage has been tripped off the paper-machine is stopped and the order is filled, each package containing the requisite number of sheets and the register showing what the order should weigh. Now suppose that an order in board-measure is received. The first thing to do is to change the machine so that it will count and register according to board-measure. This is done by operating the switch 90 on the plate U, which will now be described, Figs. 1, 6, 7, and 9.

Figure 9:
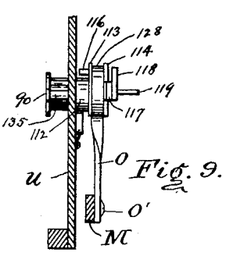
Fig. 9 shows a detail view of the switching device 90.
Figure 10:
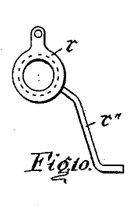
Figs. 10 and 11 show details of the collar r.
Figure 11:
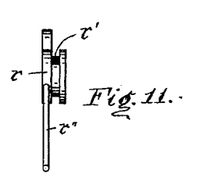

90 is an arm keyed or otherwise fastened to a short shaft 111, which is journaled in the two collars 112, fastened to the plate U.

134 and 135 are two stops.

The shaft 111 has keyed to its rear end the cam 115, to which is rigidly attached the plates 113 and 114. A ring 128 surrounds the cam 115 and is connected at its lower side to the swinging arm O, which carries one end of the arm M, as before stated. The plate 114 has a projecting arm 117, bearing at its end a plate 118 and lug 119. This arm in ream-measure is, in the position shown in Fig. 6, bearing against the lower end of the lever 121, which is connected at its other end to the link 122. This link carries a lug 123, which, as seen in Fig. 1, holds the dog 5 out of engagement with the ratchet-wheel Z. This link 122 also has pivotally attached to it the upper end of the lever 256. A swinging arm 124, Fig. 6, hanging freely in the position shown, is pivoted to the frame at 125 and is connected at its upper end to the link 126, carrying lug 127. A lever 129 is pivoted to the plate U at 132 and has one end immediately below a lug 131 on the dog $n$, and its other end bears against the collar 112 and is held in this position by a spring 133. The plate 113 bears a lug 116, which as the cam 115 is rotated, Fig. 9, is adapted to strike against the lever 129 and press it down, thus raising it at the other end and causing it by engagement with lug 131 on the dog $n$ to raise that dog, thus taking it out of mesh with the ratchet-wheel K. To change the machine from ream to board measure, the arm 90 is rotated in the direction of the arrow, Fig. 1, until it rests on the stop 134. This rotates the cam 115, which lowers the swinging arm O and through it the end of the arm M, carrying the pawl R, thus taking that pawl out of mesh with the ratchet S. As the plate 118 moves away from contact with the lower end of the lever 121 the spring 136 causes said lever 121 to swing in the direction of the arrow, so that its other end pushes the link 122 in the opposite direction, thus removing the lug 123 at the end of link 122 from its contact with the dog 5 and through the lever 256 causing the lever 259 to engage the lug 261, Fig. 20. The spring bearing against the dog 5 then forces it into mesh with the ratchet-wheel Z. As the arm 117 is swung around it strikes the lower end of the lever 124 and causes it through the link 126 and the lug 127 to pull the dog $a$ out of mesh with the ratchet-wheel W and also strikes the pawl 15 and withdraws it from mesh with the ratchet-wheel 24. (The position of the plate 118 and the lug 119 as it is about to strike the arm 124 and the dog 15 is shown in dotted lines in Fig. 7.) At the same time the lug 116 has descended and struck the end of the lever 129, causing it to strike the lug 131 and raise the dog $n$ from its mesh with the ratchet-wheel K, so that now by the operation of this switching device the pound-registering wheels W W′ W″, the package-tripping mechanism borne by the plate 17, and the sheet-counters S″ T′ T are thrown out. A spring 171 is rigidly attached to the plate U and adapted to have one end pressed into the notches 172 on the plate 114. This is merely to hold the plate 114 in position when the lever 90 has reached the stops 134 or 135.

Suppose the order is for two tons of fifty-pound packages containing four hundred sheets to a package. The machine is first fixed to count and record board-measure by turning the arm 90 into a position over the stop 134. The gage $e$ is then set to read "400" on the rod F, the cylinder C in this case counting sheets. The paper-machine is started as before, the oscillation of the lever L through the pawl N causing the ratchet-wheels K K′ to revolve, which revolves the shaft B. (The rotation of the ratchet-wheel K′ of course causes the lever $d$ to oscillate up and down as before, but since the dog $a$ is not in mesh with the ratchet-wheel Y the oscillation has no effect.) The cylinder continues to count until the four-hundredth sheet is reached. As this is counted the lug C″ strikes the projecting arm $f$ of the gage $e$. This rocks the rod F, as before, and in so doing raises the lug 10, to which is attached the link 9, which causes the lever 7 to push the pawl 5 upward, thus moving the wheel Z one division and registering one bundle. The rocking of the rod F, as in ream-measure, throws out the dog G and locks the rod F. It also throws out the dog $k'$ and the pawl N. The dog 145 still holds the wheel K and prevents it from counter rotation until the weight $u''$ has pulled the cylinder back into its initial longitudinal position. As it reaches this position it strikes the arm 149 on the rod 143, and thus causes the rod 144 at the other end of the rod 143 to pull the dog 145 out of mesh with the wheel K, thus releasing that wheel and permitting the weight on the ratchet $v'$ to return and revolve the cylinder C backward to its initial angular position. In so doing the arm $j'$ strikes the arm $i$ and unlocks the rod F, as described in ream-measure, and the dogs G and $k'$ and pawl N return to their respective operative positions. The machine then begins counting another bundle, the striking of the cylinder C against the arm 149 having pulled the rod 143 and caused it to operate the tripping device, which throws off the first bundle. Each time a bundle is tripped off the wheel Z registers one bundle, and as the fortieth bundle is counted the dog Z′ engages with the wheel X and causes it to register one ton.

Having thus described our machine, what we desire to claim and secure by Letters Patent is—

1. In an automatic counting and registering machine, a plurality of sets of counters, independent of each other and registering the operations of the machine, with mechanisms for stopping said counters at predetermined intervals variable at will, and means for starting again said sets of counters, together, substantially as described.

2. In an automatic counting and registering machine, a set of counters to count and register one class of units, a second set of counters to count and register another class of units, both operated by the same mechanism, means for stopping one set of counters, when it has counted a predetermined number, the other set continuing to count until it has counted a certain fixed number, said predetermined number and said fixed number having no constant proportionate relation, and means for starting said first set of counters to counting again when said second set has finished a cycle, substantially as described.

3. In an automatic counting and registering machine, two sets of counters, one set counting all the time, the other set counting at intervals, and means for varying at will the intervals, at which the second set shall count, substantially as described.

4. In an automatic counting and registering machine, an oscillating arm, a set of registry-wheels for registering the oscillations of said arm up to a certain predetermined number, a mechanism for automatically throwing out of gear said set of registry-wheels, when said predetermined number has been reached, means for varying said predetermined number; a second set of registry-wheels counting all the oscillations of said arm, and a mechanism for automatically throwing into gear the first set of registry-wheels when a certain constant number of oscillations has been counted by the second set, substantially as described.

5. In an automatic counting and registering machine, an oscillating arm, a set of registry-wheels counting the oscillations of said arm in cycles, a second set of registry-wheels counting a predetermined number of said oscillations, for each cycle, means for varying said predetermined number, a mechanism for throwing out of gear said second set of counters when said predetermined number is reached and means for throwing into gear again said second set, when the first set of counters has completed a cycle, substantially as described.

6. In an automatic counting and registering machine, a set of counters counting pounds, means for stopping this set of counters when a predetermined number of pounds has been counted, mechanism for varying said predetermined number; a second set of counters counting a constant number of sheets, means for starting said first set of counters each time the second set completes said constant number of sheets, and a tripping mechanism which trips off packages containing a desired number of sheets, substantially as described.

7. In an automatic counting and registering machine, an oscillating arm, two pawls mounted thereon, a set of registry-wheels operated by the first pawl and indicating pounds, means for automatically throwing out said set of registry-wheels, when a predetermined number of pounds has been counted, means for varying said predetermined number; a second set of registry-wheels operated by the second pawl indicating sheets; the two sets of counters counting together until the first set is thrown out, the second set continuing to count until it has counted a ream; with means for starting the first set again when the second set has finished counting a ream, substantially as described.

8. A cylinder for counting, provided with means for giving it a combined longitudinal and rotary motion with reference to a gage, a mechanism for automatically throwing said cylinder out of gear at a predetermined point, and means for returning it to its initial position, substantially as described.

9. A cylinder for counting, provided with means for giving it a combined longitudinal and rotary motion with reference to a gage, a mechanism for automatically throwing said cylinder out of gear at a predetermined point, and means for returning it to its initial position, by a sliding motion, which returns it to its initial longitudinal position and by an independent rotary motion, which returns it to its original angular position, substantially as described.

10. A cylinder for counting in combination with a shaft adapted to give said cylinder a rotary as well as a longitudinal motion, a gage to adjust the extent of the rotary and longitudinal motion of said shaft and cylinder, and means for returning said shaft and cylinder to their initial positions, substantially as described.

11. A cylinder for counting, in combination with a shaft adapted to give the said cylinder both a rotary and a longitudinal motion, a gage to determine the extent of the rotary and longitudinal motion of said shaft and cylinder, and means for returning said shaft and cylinder to their initial positions, substantially as described.

12. A threaded cylinder slidingly keyed to a shaft, a dog to engage the thread of said cylinder, a pawl and ratchet to turn said shaft, a set of registry-wheels to record each part turn of said cylinder, a gage to determine a point, at which said cylinder shall cease to turn, with means for throwing out of gear said cylinder and its corresponding set of registry-wheels, a mechanism for returning said cylinder to its initial position; a second set of registry-wheels and a pawl operating the same, said second set of registry-wheels counting a constant number in cycles, with means for throwing into gear said cylinder and the first set of registry-wheels each time the second set finishes counting a cycle, substantially as described.

13. In an automatic counting and registering machine, a threaded cylinder slidingly keyed to a shaft, a dog to engage the thread on said cylinder, and cause it as it rotates to travel along said shaft, a gage to control the distance said cylinder shall travel along said shaft; a gear attached to said shaft and operated by a pawl and ratchet; a set of counters for registering each part turn of said cylinder, means for throwing out of gear said pawl and ratchet when a predetermined number has been counted, and returning said cylinder to its initial position, in readiness to count another lot substantially as described.

14. A threaded cylinder slidingly keyed to a shaft, a pawl and ratchet for turning said shaft, a dog adapted to engage the thread of said cylinder and cause it to travel along said shaft as said shaft is revolved, and means for throwing out of mesh said pawl and ratchet when said cylinder has traveled a certain predetermined distance along said shaft, substantially as described.

15. A cylinder for counting, operated by a pawl and ratchet, having an adjustable graduated ring carrying a lug, the graduations of said ring being equal to the angle through which said cylinder is turned for every operation of said pawl and ratchet, so that the number of operations of said pawl and ratchet that will bring the lug to a certain position, may be varied at will substantially as described.

16. A graduated rod carrying a sliding gage, said graduations being equal to the pitch of the thread on a cylinder bearing a lug which is adapted to engage with an arm on said gage, so that when the said cylinder has reached a certain position to be determined by the position of said gage upon said rod, said lug will strike said arm and rock it, such as described.

17. A threaded cylinder having a sliding and rotary motion, a lug mounted thereon, a dog adapted to engage the thread of said cylinder, a gage-rod, a cam secured to said gage-rod, said cam holding said dog in engagement with the thread of said cylinder, and a gage with an arm mounted thereon, adapted at a certain predetermined position of said cylinder, to be struck by said lug and rock said gage-rod, thus rotating said cam and permitting said dog to rise out of engagement with the thread on said cylinder, substantially as described.

18. A threaded cylinder for counting, a dog for engaging the thread of said cylinder, a rocking gage-rod, a sliding gage carrying an arm designed to engage with a lug on said cylinder, the time of striking to be determined by the position of said gage and a registry-wheel to register each time said lug rocks said gage-rod, substantially as described.

19. A cylinder with a worm, adapted to slide along its shaft, operated by a pawl and ratchet, a gage to determine a point at which this sliding motion shall cease, a set of registry-wheels for registering each operation of said pawl and ratchet and means for throwing out of gear and returning to its initial position, said cylinder and causing said registry-wheels to stop registering until said cylinder begins to count again, substantially as described.

20. A dog for preventing counter rotation in a ratchet-wheel having a notch and an extension designed to be raised by a lug on registry-wheel, a catch having a tooth designed to drop into said notch and hold said dog out of engagement, said catch having a downward extension designed to be struck and raised by a lug on another registry-wheel, at a certain interval after said dog has been raised, thus releasing said dog, substantially as described.

21. A spool having flanges operated by a pawl and ratchet, said flanges having lugs adapted to strike and oscillate up and down a rod carrying a series of pawls adapted to engage with a series of ratchet-wheels fixed to disks, said ratchet-wheels having a varying number of teeth, said disks having lugs adapted to engage with a lug on an arm which operates a tripping device, said arm being adjustable so that it may be caused to engage with any one disk, the others being inoperative, substantially as described.

22. A spool having flanges operated by a pawl and ratchet, said flanges having lugs adapted to strike and oscillate up and down a rod carrying a series of pawls adapted to engage with a series of ratchet-wheels, said ratchet-wheels having a varying number of teeth, and having lugs adapted to engage with a lug on an arm which operates a tripping device, said arm being adjustable, so that it may be caused to engage with the lug on any one of said series of ratchet-wheels, the others being inoperative, substantially as described.

23. A main counting-wheel and a series of auxiliary counting-wheels, said auxiliary counting-wheels having different number of teeth, means by which all of said auxiliary counting-wheels are made to turn one division for each turn of said main counting-wheel, and means by which any one of said auxiliary counting-wheels may be caused to register for any part of its revolution, substantially as described.

24. A main counting-wheel and a series of auxiliary counting-wheels, said auxiliary counting-wheels having different number of teeth, means by which all of said auxiliary counting wheels are made to turn one division for each turn of said main counting-wheel, and means by which any one of said auxiliary counting-wheels may be caused to register for any part of its revolution, and mechanism for returning all of said wheels to their initial position, substantially as described.

C. D. GRIMES.
W. W. SUNDERLAND.
BENJ. F. EILERMAN.

Witnesses:
A. H. PLUMMER,
W. C. TULLIS.